(12) United States Patent
Khoshnevisan et al.

(10) Patent No.: US 12,155,409 B2
(45) Date of Patent: Nov. 26, 2024

(54) PHYSICAL UPLINK SHARED CHANNEL REPETITION WITH FREQUENCY HOPPING

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/248,169

(22) Filed: Jan. 12, 2021

(65) Prior Publication Data

US 2021/0218437 A1    Jul. 15, 2021

Related U.S. Application Data

(60) Provisional application No. 62/961,027, filed on Jan. 14, 2020.

(51) Int. Cl.
  *H04B 1/713* (2011.01)
  *H04W 72/04* (2023.01)
(52) U.S. Cl.
  CPC ............ *H04B 1/713* (2013.01); *H04W 72/04* (2013.01)
(58) Field of Classification Search
  None
  See application file for complete search history.

(56) References Cited

U.S. PATENT DOCUMENTS

| | | | |
|---|---|---|---|
| 2019/0082456 A1* | 3/2019 | Kim | H04L 27/2602 |
| 2019/0306841 A1* | 10/2019 | Huang | H04W 76/34 |
| 2020/0052827 A1* | 2/2020 | Vilaipornsawai | H04L 5/0051 |
| 2021/0190530 A1* | 6/2021 | Jung | G01C 21/3644 |
| 2021/0298054 A1* | 9/2021 | Wong | H04L 5/0053 |
| 2022/0052797 A1* | 2/2022 | Yu | H04W 72/23 |
| 2022/0095353 A1* | 3/2022 | Liu | H04W 72/1289 |
| 2022/0150928 A1* | 5/2022 | Choi | H04L 27/2602 |

FOREIGN PATENT DOCUMENTS

| | | |
|---|---|---|
| CN | 104811220 A | 7/2015 |
| CN | 108092757 A | 5/2018 |
| CN | 108632191 A | 10/2018 |
| WO | WO-2019030220 A1 | 2/2019 |

(Continued)

OTHER PUBLICATIONS

International Search Report and Written Opinion—PCT/US2021/070026—ISA/EPO—May 3, 2021.

(Continued)

*Primary Examiner* — Rebecca E Song
(74) *Attorney, Agent, or Firm* — Harrity & Harrity, LLP

(57) ABSTRACT

Various aspects of the present disclosure generally relate to wireless communication. In some aspects, a user equipment (UE) may transmit a first set of repetitions of a physical uplink shared channel (PUSCH) communication using a plurality of sets of values for a set of transmission parameters on a first set of frequencies using frequency hopping; and transmit a second set of repetitions of the PUSCH communication using the plurality of sets of values for the set of transmission parameters on a second set of frequencies using frequency hopping. Numerous other aspects are provided.

30 Claims, 6 Drawing Sheets

(56) References Cited

FOREIGN PATENT DOCUMENTS

| WO | 2019203325 A1 | 10/2019 |
| WO | WO-2021029367 A1 * | 2/2021 |
| WO | WO-2021038658 A1 * | 3/2021 |

OTHER PUBLICATIONS

NTT Docomo, et al., "Enhancements on Multi-TRP/Panel Transmission," 3GPP Draft, 3GPP TSG RAN WG1 Ad-Hoc Meeting 1901, R1-1900978, Enhancements on Multi TRP and Panel Transmission, 3rd Generation Partnership Project (3GPP), Mobile Competence Centre, 650, Route Des Lucioles, F-06921, Sophia-Antipolis Cedex, France, vol. Ran WG1. No. Taipei, Jan. 21, 2019-Jan. 25, 2019, Jan. 20, 2019 (Jan. 20, 2019), XP051593823, 19 pages, Retrieved from the Internet: URL: http://www.3gpp.org/ftp/Meetings%5F3GPP%5FSYNC/RAN1/Docs/R1%2D1900978%2Ezip [retrieved on Jan. 20, 20190] p. 14, paragraph 3.4.

NTT Docomo, Inc: "UL Data Transmission Procedure," 3GPP Draft, 3GPP TSG RAN WG1 Meeting #92bis, R1-1805057, 3rd Generation Partnership Project (3GPP), Mobile Competence Centre, 650, Route Des Lucioles, F-06921, Sophia-Antipolis Cedex, France, vol. RAN WG1. No. Sanya, China, Apr. 16, 2018-Apr. 20, 2018, Apr. 15, 2018 (Apr. 15, 2018), XP051427318, 5 pages, Retrieved from the Internet: URL: http://www.3gpp.org/ftp/Meetings%5F3GPP%5FSYNC/RAN1/Docs/ [retrieved on Apr. 15, 2018] p. 2. Paragraph.

Panasonic: "On NR URLLC L1 Enhancements," 3GPP Draft, 3GPP TSG RAN WG1 Meeting #94bis, R1-1810474_PANASONIC_NR_URLLC_L1_ENHANCEMENTS, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 28, 2018 (Sep. 28, 2018), XP051517882, 9 pages, Retrieved from the Internet: URL: http://www.3gpp.org/ftp/tsg%5Fran/WG1%5FRL1/TSGR1%5F94b/Docs/R1%2D1810474%2Ezip [retrieved on Sep. 28, 2018] p. 5, paragraph Inter-repetition frequency hopping within a slot.

Panasonic: "On PUSCH Enhancements for NR URLLC," 3GPP Draft, 3GPP TSG RAN WG1 #97, R1-1907029, Panasonic_NR_URLLC_PUSCH_Enhancements_VFINAL, 3rd Generation Partnership Project (3GPP), Mobile Competence Centre, 650, Route Des Lucioles, F-06921, Sophia-Antipolis Cedex, France, vol. RAN WG1. No. Reno. USA, May 13, 2019-May 17, 2019, May 13, 2019 (May 13, 2019), XP051728477, 9 pages, Retrieved from the Internet: URL:http://www.3gpp.org/ftp/Meetings%5F3GPP%5FSYNC/RAN1/Docs/R1%2D1907029%2Ezip [retrieved on May 13, 2019] p. 7, paragraph Iter-repetition hopping.

Qualcomm Incorporated: "PUSCH Enhancements for eURLLC," 3GPP Draft, 3GPP TSG-RAN WG1 #99, R1-1912961, 3rd Generation Partnership Project (3GPP), Mobile Competence Centre, 650, Route Des Lucioles, F-06921, Sophia-Antipolis Cedex, France, vol. RAN WG1. No. Reno. Nevada. USA, Nov. 18, 2019-Nov. 22, 2019, Nov. 9, 2019 (Nov. 9, 2019), XP051823723, pp. 1-7, Retrieved from the Internet: URL: https://ftp.3gpp.org/tsg_ran/WG1_RL1/TSGR1_99/Docs/R1-1912961.zip R1-1912961 PUSCH enhancements for eURLLC.docx [retrieved on Nov. 9, 2019] p. 6, Paragraph.

* cited by examiner

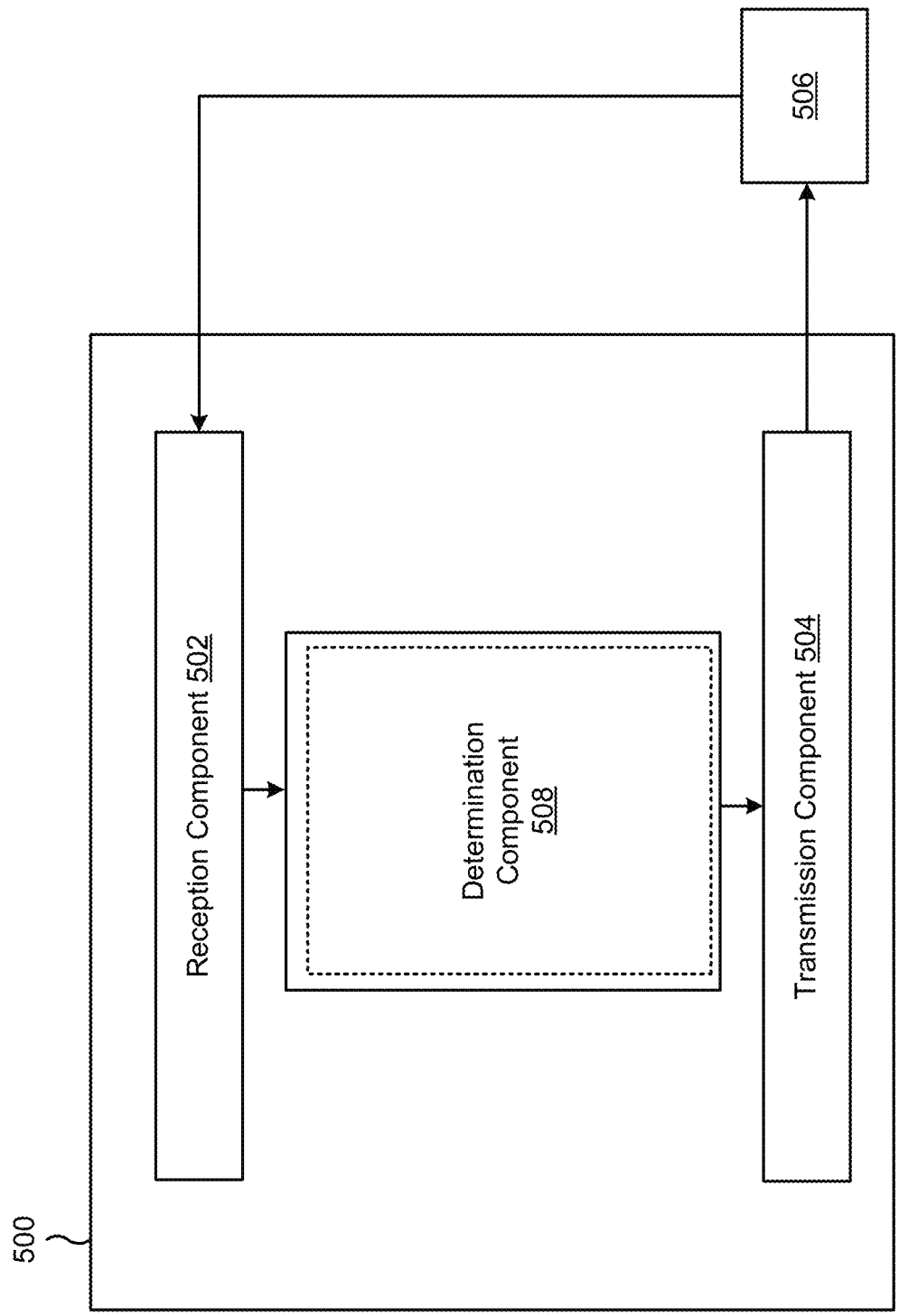

PHYSICAL UPLINK SHARED CHANNEL REPETITION WITH FREQUENCY HOPPING

CROSS-REFERENCE TO RELATED APPLICATION

This patent application claims priority to U.S. Provisional Patent Application No. 62/961,027, filed on Jan. 14, 2020, entitled "PHYSICAL UPLINK SHARED CHANNEL REPETITION WITH FREQUENCY HOPPING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for physical uplink shared channel repetition with frequency hopping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a first set of repetitions of a physical uplink shared channel (PUSCH) communication using a plurality of sets of values for a set of transmission parameters on a first set of frequencies using frequency hopping; and transmitting a second set of repetitions of the PUSCH communication using the plurality of sets of values for the set of transmission parameters on a second set of frequencies using frequency hopping.

In some aspects, a UE for wireless communication may include memory and one or more processors operatively coupled to the memory. The memory and the one or more processors may be configured to transmit a first set of repetitions of a PUSCH communication using a plurality of sets of values for a set of transmission parameters on a first set of frequencies using frequency hopping; and transmit a second set of repetitions of the PUSCH communication using the plurality of sets of values for the set of transmission parameters on a second set of frequencies using frequency hopping.

In some aspects, a non-transitory computer-readable medium may store one or more instructions for wireless communication. The one or more instructions, when executed by one or more processors of a UE, may cause the one or more processors to transmit a first set of repetitions of a PUSCH communication using a plurality of sets of values for a set of transmission parameters on a first set of frequencies using frequency hopping; and transmit a second set of repetitions of the PUSCH communication using the plurality of sets of values for the set of transmission parameters on a second set of frequencies using frequency hopping.

In some aspects, an apparatus for wireless communication may include means for transmitting a first set of repetitions of a PUSCH communication using a plurality of sets of values for a set of transmission parameters on a first set of frequencies using frequency hopping; and means for transmitting a second set of repetitions of the PUSCH communication using the plurality of sets of values for the set of transmission parameters on a second set of frequencies using frequency hopping.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a block diagram of an example apparatus for wireless communication, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
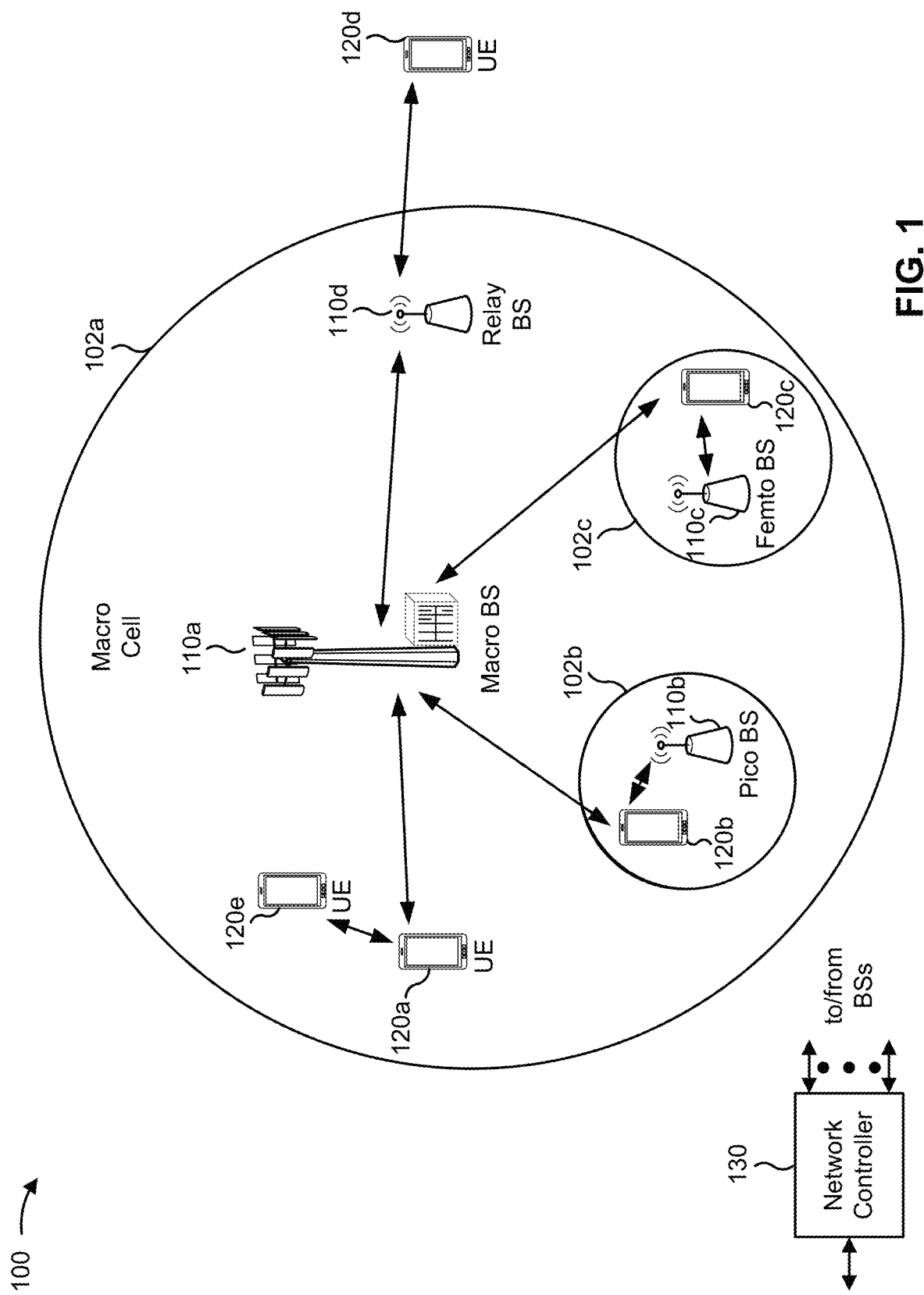
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
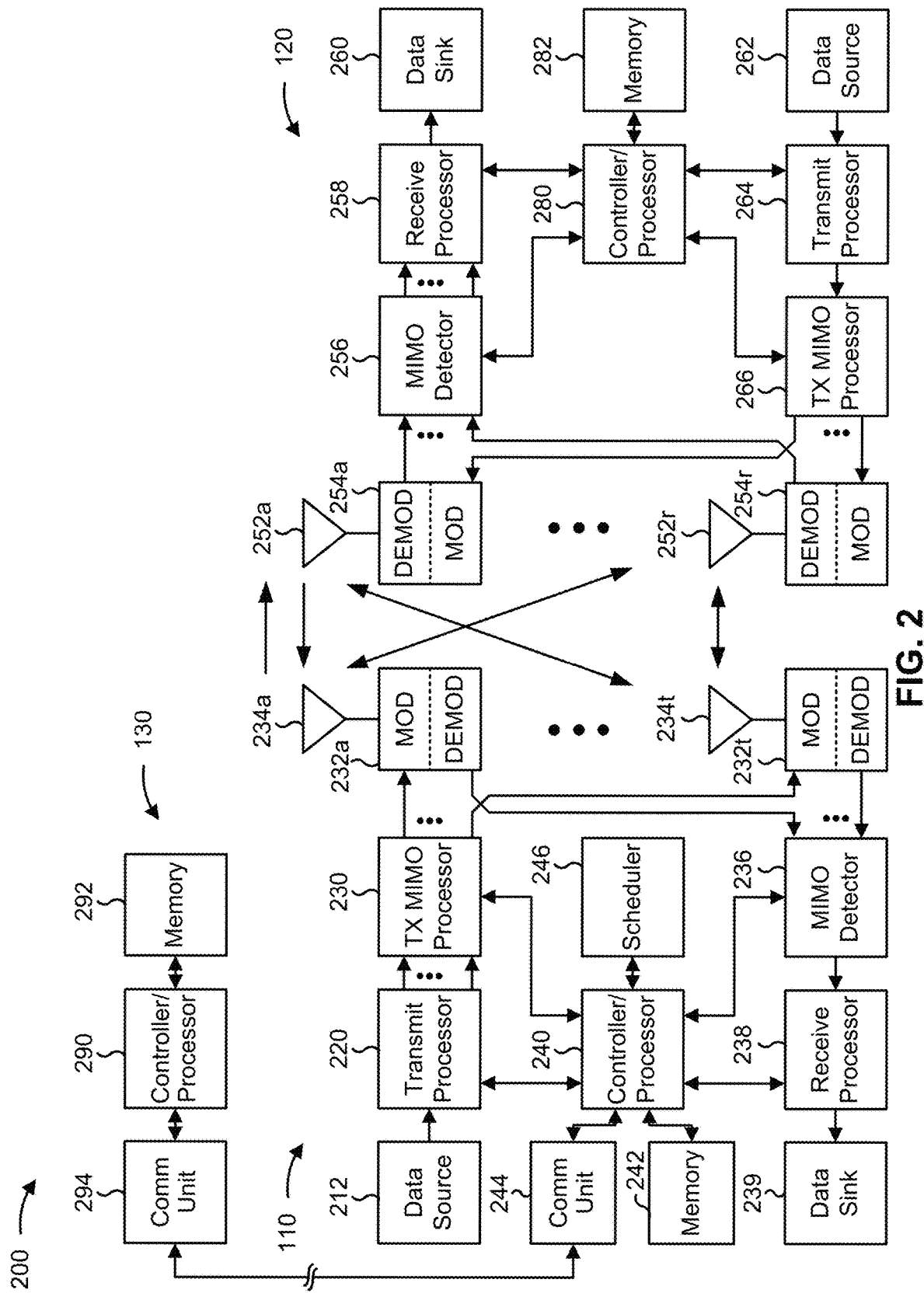
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with physical uplink shared channel (PUSCH) repetition with frequency hopping, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for transmitting a first set of repetitions of a PUSCH communication using a plurality of sets of values for a set of transmission parameters on a first set of frequencies using frequency hopping, means for transmitting a second set of repetitions of the PUSCH communication using the plurality of sets of values for the set of transmission parameters on a second set of frequencies using frequency hopping, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communication systems, a UE may transmit repetitions of a single communication to increase reliability and/or robustness. For example, a UE may transmit a plurality of repetitions of a PUSCH communication using multiple panels and/or to multiple TRPs. In this way, the UE reduces a likelihood that an interruption to a transmission on a particular link causes a communication to be dropped (e.g., as a result of an object physically blocking a transmission path or the particular link or as a result of other communications interfering with the particular link). In some cases, the UE may vary one or more transmission parameters when transmitting repetitions of a communication. For example, the UE may transmit repetitions of a PUSCH communication using a plurality of different PUSCH transmission occasions occurring at a common transport block within different slots or mini-slots. However, interference and/or blockages may affect the plurality of different repetitions on a particular frequency.

Some aspects described herein enable frequency hopping during PUSCH repetition. For example, the UE may hop between a plurality of frequencies when transmitting a set of repetitions of a PUSCH communication. Moreover, the UE may vary, within sets of repetitions or between sets of repetitions, one or more transmission parameters, such as spatial relationship parameters, spatial domain transmission filters, uplink beams, precoders, transmitted precoding matrix indicators (TPMIs), resource block offsets, frequencies, and/or the like. In this way, the UE may further increase a reliability and/or robustness of PUSCH communications, thereby reducing a likelihood of dropped PUSCH communications.

Figure 3A:
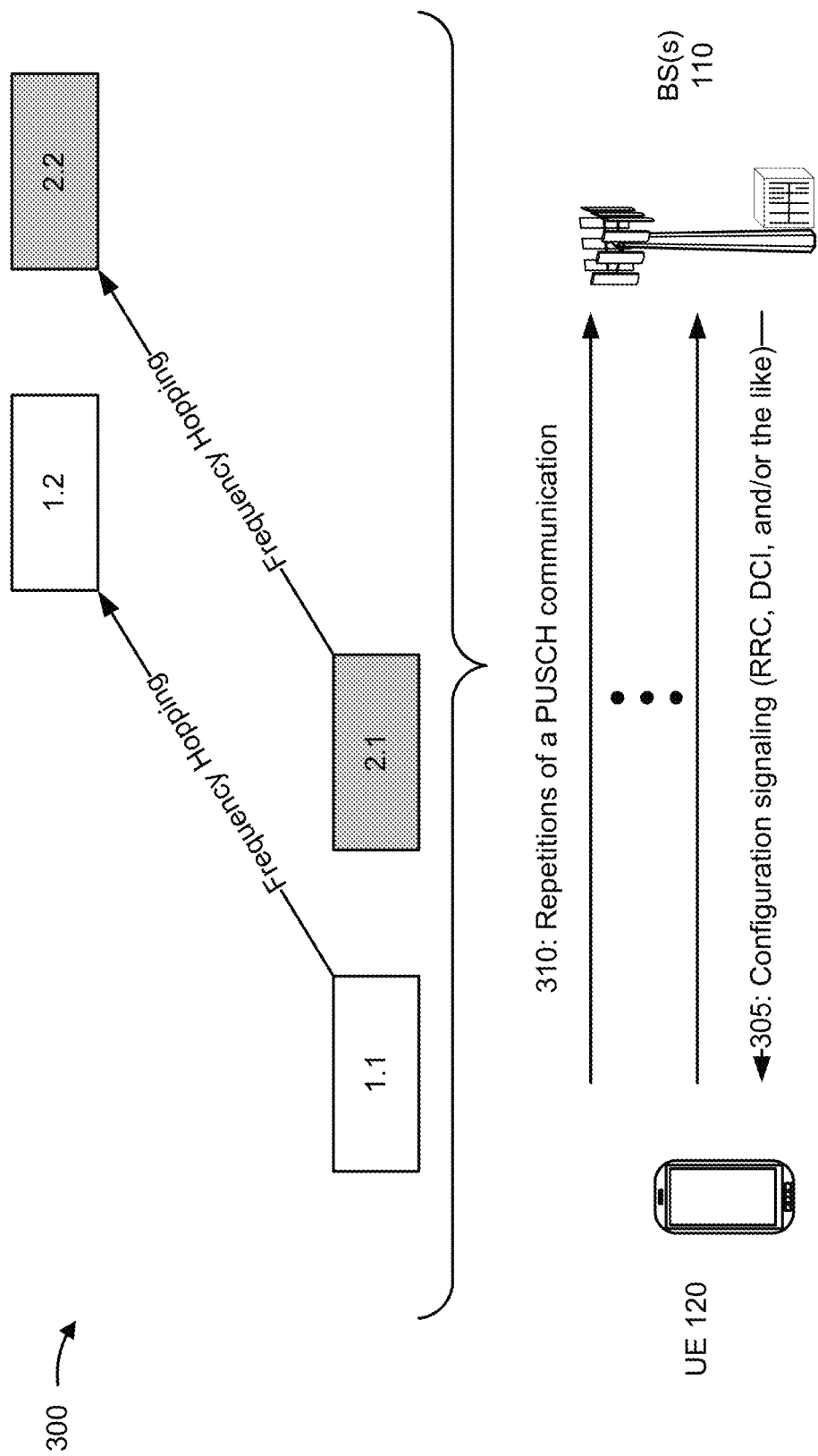
FIGS. 3A and 3B are diagrams illustrating examples of physical uplink shared channel repetition with frequency hopping, in accordance with various aspects of the present disclosure.
Figure 3B:
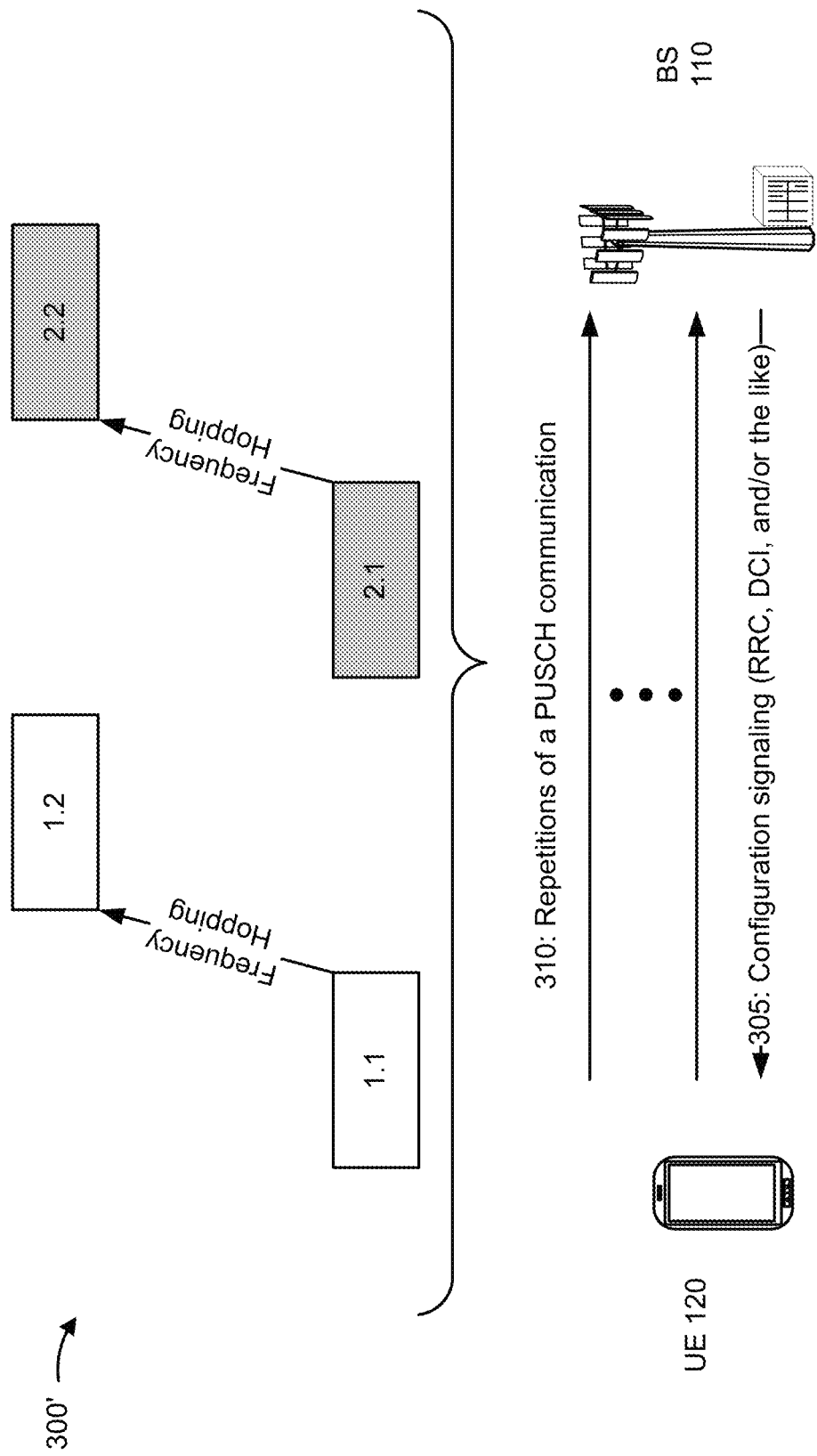

FIGS. 3A and 3B are diagrams illustrating examples 300/300' of PUSCH repetition with frequency hopping, in accordance with various aspects of the present disclosure. As shown in FIGS. 3A and 3B, examples 300/300' include a UE 120 and one or more BSs 110, which may provide a set of TRPs for receiving repetitions of a PUSCH communication.

As further shown in FIG. 3A, and by reference number 305, UE 120 may receive configuration signaling. For example, UE 120 may receive radio resource control (RRC) signaling, downlink control information (DCI) signaling, and/or the like identifying one or more transmission parameters, one or more repetition parameters, one or more frequency hopping parameters, and/or the like. In some aspects, UE 120 may receive configuration signaling indicating that UE 120 is to use different transmission parameters for different sets of repetitions of, for example, a dynamic grant PUSCH communication. For example, UE 120 may receive configuration signaling indicating a first set of values for a set of transmission parameters for use with a first set of repetitions and indicating a second set of values for the set of transmission parameters for use with a second set of repetitions. In this case, the set of transmission parameters may include an uplink power control (ULPC) parameter, a TPMI parameter, a spatial relation parameter, and/or the like. Additionally, or alternatively, UE 120 may determine to perform inter-repetition frequency hopping among repetitions with the same set of transmission parameters. In some aspects, UE 120 may receive configuration signaling (e.g., RRC signaling) indicating that UE 120 is to perform inter-repetition frequency hopping across a plurality of sets of repetitions (e.g., across all repetitions in all sets of repetitions). In some aspects, UE 120 may receive configuration signaling indicating an order for repetitions of the PUSCH communication, as described in more detail below.

In some aspects, UE 120 may receive DCI signaling configuring one or more frequency hopping parameters. For example, UE 120 may receive DCI signaling indicating that the same parameters are to be applied to a plurality of sets of repetitions of the PUSCH communication. In this case, the DCI signaling may include information indicating that frequency hopping is enabled (e.g., the RRC signaling may include information identifying a frequency hopping mode, such as whether inter-repetition frequency hopping is to be used when frequency hopping is enabled using the DCI signaling). Similarly, the DCI signaling may include information selecting a value from a resource block offset list (e.g., which may be configured using RRC signaling) for each set of repetitions. In some aspects, such as when inter-repetition frequency hopping is configured, UE 120 may perform separate frequency hopping for each set of repetitions with a common resource block offset value.

In some aspects, UE 120 may receive RRC signaling configuring a set of frequency hopping parameters, and may receive subsequent DCI signaling adjusting or altering the set of frequency hopping parameter. For example, UE 120 may determine that a first set of repetitions is not configured for frequency hopping and that a second set of repetitions is configured for inter-repetition frequency hopping. Additionally, or alternatively, UE 120 may determine that the first set of repetitions is configured for inter-slot frequency hopping and the second set of repetitions is configured for inter-repetition frequency hopping. Additionally, or alternatively, UE 120 may determine that the first set of repetitions is configured with a first resource block offset list from which to obtain a resource block offset value and the second set of repetitions is configured with a second resource block offset list.

In some aspects, the DCI signaling may include a single set of bits to control frequency hopping behavior for the different sets of repetitions. In this case, UE 120 may map a bit indicator in the single set of bits to a configuration for the first set of repetitions and the second set of repetitions. In other words, based at least in part on receiving DCI signaling with a particular bit indicator, UE 120 may determine that, for example, inter-slot frequency hopping is to be performed for a first set of repetitions and inter-repetition frequency hopping is to be performed for a second set of repetitions.

In some aspects, the DCI signaling may have a plurality of sets of bits to control frequency behavior for a plurality of different sets of repetitions. For example, UE 120 may receive, from BS 110, DCI signaling including a first bit indicating whether frequency hopping is to be performed for a first set of repetitions and a second bit indicating whether frequency hopping is to be performed for a second set of repetitions. Additionally, or alternatively, UE 120 may determine, based at least in part on a set of most significant bits (MSBs) of a frequency domain resource assignment (FDRA) field of the DCI signaling, a first resource block offset value from a first resource block offset list (e.g., that was configured using RRC signaling) and a second resource block offset value from a second resource block offset list.

In some aspects, UE 120 may receive configuration signaling for a configured grant PUSCH type of communication. For example, UE 120 may receive RRC signaling for a type-1 configured grant PUSCH communication. In this case, the RRC signaling may include information identifying a set of transmission parameters, which may include a resource block offset value for a configured grant PUSCH communication. Additionally, or alternatively, UE 120 may receive both RRC signaling and DCI signaling configuring a type-2 configured grant PUSCH communication. For example, UE 120 may receive RRC signaling identifying a periodicity for the configured grant PUSCH communication, a transmission opportunity for the configured grant PUSCH communication, and/or the like, and may receive DCI signaling activating the configured grant PUSCH communication. In this case, the DCI signaling may include information enabling frequency hopping or adjusting another frequency hopping parameter, as described above. In some aspects, for a configured grant PUSCH communication, UE 120 may receive configuring signaling to configure one or more frequency hopping modes, one or more resource block offset values, and/or the like for a plurality of sets of repetitions of the configured grant PUSCH communication. Additionally, or alternatively, UE 120 may receive configuration signaling to configure whether inter-repetition frequency hopping is to be performed across all repetitions or within sets of repetitions with the same transmission parameters, as described above.

As further shown in FIG. 3A, and by reference number 310, UE 120 may transmit repetitions of a PUSCH communication. For example, UE 120 may transmit, to one or more BSs 110, a first set of repetitions of the PUSCH communication and a second set of repetitions of the PUSCH communication. In this case, as shown in FIG. 3A, UE 120 may transmit a first repetition of the first set of repetitions (1.1) before a first repetition of the second set of repetitions (2.1), which is transmitted before a second repetition of the first set of repetitions (1.2), and which is transmitted before a second repetition of the second set of repetitions (2.2). In contrast, as shown in FIG. 3B, UE 120 may transmit a first repetition of the first set of repetitions (1.1) before a second repetition of the first set of repetitions (1.2), which is transmitted before a first repetition of the second set of repetitions (2.1), and which is transmitted before a second repetition of the second set of repetitions (2.2). In some aspects, UE 120 may transmit the sets of repetitions of the PUSCH communication in accordance with a set of transmission parameters and/or frequency parameters, as described above.

As indicated above, FIGS. 3A and 3B are provided as an example. Other examples may differ from what is described with respect to FIGS. 3A and 3B.

Figure 4:
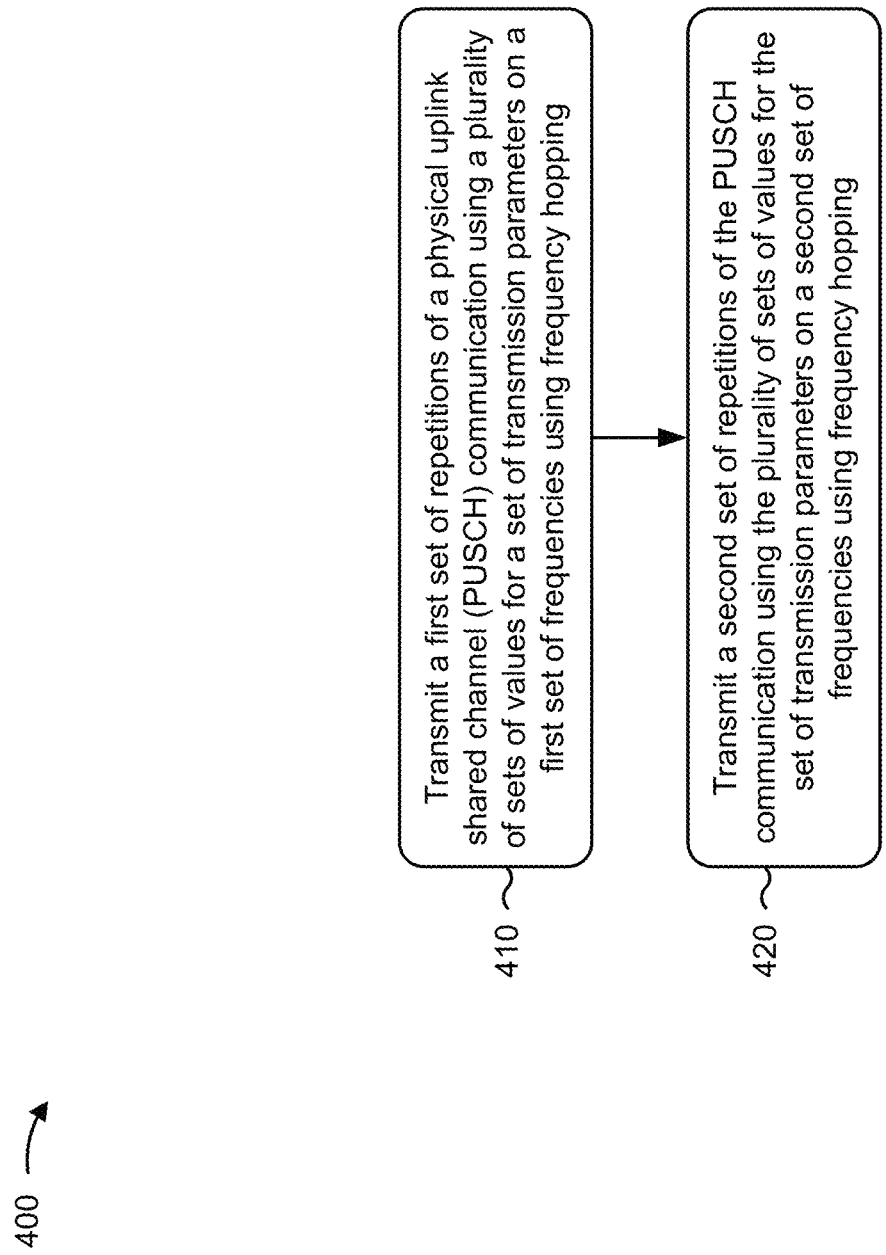
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with PUSCH repetition with frequency hopping.

As shown in FIG. 4, in some aspects, process 400 may include transmitting a first set of repetitions of a PUSCH communication using a plurality of sets of values for a set of transmission parameters on a first set of frequencies using frequency hopping (block 410). For example, the UE (e.g., using controller/processor 280, transmit processor 264, TX MIMO processor 266, MOD 254, antenna 252, and/or the like) may transmit a first set of repetitions of a PUSCH communication using a plurality of sets of values for a set of transmission parameters on a first set of frequencies using frequency hopping, as described above.

As further shown in FIG. 4, in some aspects, process 400 may include transmitting a second set of repetitions of the PUSCH communication using the plurality of sets of values for the set of transmission parameters on a second set of frequencies using frequency hopping (block 420). For example, the UE (e.g., using controller/processor 280, transmit processor 264, TX MIMO processor 266, MOD 254, antenna 252, and/or the like) may transmit a second set of repetitions of the PUSCH communication using the plurality of sets of values for the set of transmission parameters on a second set of frequencies using frequency hopping, as described above.

Process 400 may include additional aspects, such as any single aspect or any combination of aspects described below and/or in connection with one or more other processes described elsewhere herein.

In a first aspect, the first set of repetitions are associated with a first beam, uplink power control, or transmission precoding matrix indicator and the second set of repetitions are associated with a second beam, uplink power control, or transmission precoding matrix indicator.

In a second aspect, alone or in combination with the first aspect, a first repetition of the first set of repetitions is transmitted before a second repetition of the first set of repetitions, which is transmitted before a first repetition of the second set of repetitions, which is transmitted before a second repetition of the second set of repetitions.

In a third aspect, alone or in combination with one or more of the first and second aspects, an order of repetitions of the first set of repetitions and the second set of repetitions is configured via radio resource control signaling.

In a fourth aspect, alone or in combination with one or more of the first through third aspects, frequency hopping between frequencies of at least one of the first set of frequencies or the second set of frequencies is performed in accordance with a set of frequency hopping parameters.

In a fifth aspect, alone or in combination with one or more of the first through fourth aspects, process 400 includes receiving radio resource control signaling to identify the set of frequency hopping parameters for at least one of the first set of repetitions or the second set of repetitions.

In a sixth aspect, alone or in combination with one or more of the first through fifth aspects, process 400 includes receiving downlink control information signaling to identify the set of frequency hopping parameters for at least one of the first set of repetitions or the second set of repetitions.

In a seventh aspect, alone or in combination with one or more of the first through sixth aspects, the downlink control information signaling changes at least one frequency hopping parameter, relative to previous radio resource control signaling identifying the set of frequency hopping parameters, for the at least one of the first set of repetitions or the second set of repetitions.

In an eighth aspect, alone or in combination with one or more of the first through seventh aspects, the set of frequency hopping parameters includes at least one of a frequency hopping enablement parameter, a frequency hopping mode parameter, or a resource block offset parameter.

In a ninth aspect, alone or in combination with one or more of the first through eighth aspects, the set of frequency hopping parameters is common to the first set of repetitions and the second set of repetitions.

In a tenth aspect, alone or in combination with one or more of the first through ninth aspects, the set of frequency hopping parameters is associated with a first group of values for the first set of repetitions and a second group of values for the second set of repetitions.

In an eleventh aspect, alone or in combination with one or more of the first through tenth aspects, downlink control information identifying the set of frequency hopping parameters includes a single group of bits to configure one or more values for the set of frequency hopping parameters for the first set of repetitions and the second set of repetitions.

In a twelfth aspect, alone or in combination with one or more of the first through eleventh aspects, downlink control information identifying the set of frequency hopping parameters includes a first group of bits to configure a first one or more values for the set of frequency hopping parameters for the first set of repetitions and a second group of bits to configure one or more values for the set of frequency hopping parameters for the second set of repetitions.

In a thirteenth aspect, alone or in combination with one or more of the first through twelfth aspects, downlink control information identifying the set of frequency hopping parameters includes one or more most significant bits to indicate one or more resource block offset values, from a radio resource control configured resource block offset value list, for the set of frequency hopping parameters.

In a fourteenth aspect, alone or in combination with one or more of the first through thirteenth aspects, the first set of repetitions conveys a complete PUSCH message and the second set of repetitions conveys the complete PUSCH message.

In a fifteenth aspect, alone or in combination with one or more of the first through fourteenth aspects, the PUSCH communication is a configured grant PUSCH communication, and the configured grant PUSCH communication is a type 1 or a type 2 configured grant PUSCH communication.

In a sixteenth aspect, alone or in combination with one or more of the first through fifteenth aspects, process 400 includes receiving a configuration message for the configured grant PUSCH communication, wherein the configuration is messaging identifies a set of values for a resource block offset for at least one of the first set of repetitions or the second set of repetitions.

In a seventeenth aspect, alone or in combination with one or more of the first through sixteenth aspects, process 400 includes receiving a downlink control information message identifying one or more frequency hopping parameters, wherein the downlink control information message activates the configured grant PUSCH communication.

In an eighteenth aspect, alone or in combination with one or more of the first through seventeenth aspects, the set of transmission parameters includes at least one of an uplink power control parameter, a transmitted precoding matrix indicator parameter, or a spatial relationship.

In a nineteenth aspect, alone or in combination with one or more of the first through seventeenth aspects, a first repetition of the first set of repetitions is transmitted on a first frequency hop of the first set of repetitions and before a first repetition of the second set of repetitions, which is transmitted on a first frequency hop of the second set of repetitions and before a second repetition of the first set of repetitions that is transmitted on a second frequency hop of the first set of repetitions and that is transmitted before a second repetition of the second set of repetitions, which is transmitted on a second frequency hop of the second set of repetitions.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a block diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include a determination component 508, among other examples.

In some aspects, the apparatus 500 may be configured to perform one or more operations described herein in connection with FIGS. 3A-3B. Additionally, or alternatively, the apparatus 500 may be configured to perform one or more processes described herein, such as process 400 of FIG. 4, among other examples. In some aspects, the apparatus 500 and/or one or more components shown in FIG. 5 may include one or more components of the UE described above in connection with FIG. 2. Additionally, or alternatively, one or more components shown in FIG. 5 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a demodulator, a MIMO detector, a receive processor, a controller/processor, a memory, or a combination thereof, of the UE described above in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, a memory, or a combination thereof, of the UE described above in connection with FIG. 2. In some aspects, the transmission component 504 may be co-located with the reception component 502 in a transceiver.

The transmission component 504 may transmit a first set of repetitions of a physical uplink shared channel (PUSCH) communication using a plurality of sets of values for a set of transmission parameters on a first set of frequencies using frequency hopping. The transmission component 504 may transmit a second set of repetitions of the PUSCH communication using the plurality of sets of values for the set of transmission parameters on a second set of frequencies using frequency hopping. The determination component 508 may determine a frequency hopping configuration, such as which transmission parameters to use for which repetitions of a PUSCH communication. The determination component 508 may include a transmit processor, a controller/processor, a memory, or a combination thereof of the UE described above in connection with FIG. 2.

The reception component 502 may receive radio resource control signaling to identify the set of frequency hopping parameters for at least one of the first set of repetitions or the second set of repetitions. The reception component 502 may receive downlink control information signaling to identify the set of frequency hopping parameters for at least one of the first set of repetitions or the second set of repetitions. The reception component 502 may receive a configuration message for the configured grant PUSCH communication, wherein the configuration message identifies a set of values for a resource block offset for at least one of the first set of repetitions or the second set of repetitions. The reception component 502 may receive a downlink control information message identifying one or more frequency hopping parameters, wherein the downlink control information message activates the configured grant PUSCH communication.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some aspects of the present disclosure:

Aspect 1: A method of wireless communication performed by a user equipment (UE), comprising: transmitting a first set of repetitions of a physical uplink shared channel (PUSCH) communication using a plurality of sets of values for a set of transmission parameters on a first set of frequencies using frequency hopping; and transmitting a second set of repetitions of the PUSCH communication using the plurality of sets of values for the set of transmission parameters on a second set of frequencies using frequency hopping.

Aspect 2: The method of aspect 1, wherein a first repetition of the first set of repetitions is transmitted on a first frequency hop of the first set of repetitions and before a first repetition of the second set of repetitions, which is transmitted on a first frequency hop of the second set of repetitions and before a second repetition of the first set of repetitions that is transmitted on a second frequency hop of the first set of repetitions and that is transmitted before a second repetition of the second set of repetitions, which is transmitted on a second frequency hop of the second set of repetitions.

Aspect 3: The method of any of aspects 1 to 2, wherein a first repetition of the first set of repetitions is transmitted before a second repetition of the first set of repetitions, which is transmitted before a first repetition of the second set of repetitions, which is transmitted before a second repetition of the second set of repetitions.

Aspect 4: The method of any of aspects 1 to 3, wherein an order of repetitions of the first set of repetitions and the second set of repetitions is configured via radio resource control signaling.

Aspect 5: The method of any of aspects 1 to 4, wherein frequency hopping between frequencies of at least one of the first set of frequencies or the second set of frequencies is performed in accordance with a set of frequency hopping parameters.

Aspect 6: The method of aspect 5, further comprising: receiving radio resource control signaling to identify the set of frequency hopping parameters for at least one of the first set of repetitions or the second set of repetitions.

Aspect 7: The method of any of aspects 5 to 6, further comprising: receiving downlink control information signaling to identify the set of frequency hopping parameters for at least one of the first set of repetitions or the second set of repetitions.

Aspect 8: The method of aspect 7, wherein the downlink control information signaling sets at least one frequency hopping parameter from previous radio resource control signaling identifying the set of frequency hopping parameters, for the at least one of the first set of repetitions or the second set of repetitions.

Aspect 9: The method of any of aspects 5 to 8, wherein the set of frequency hopping parameters includes at least one of: a frequency hopping enablement parameter, a frequency hopping mode parameter, or a resource block offset parameter.

Aspect 10: The method of any of aspects 5 to 9, wherein the set of frequency hopping parameters is common to the first set of repetitions and the second set of repetitions.

Aspect 11: The method of any of aspects 5 to 10, wherein the set of frequency hopping parameters is associated with a first group of values for the first set of repetitions and a second group of values for the second set of repetitions.

Aspect 12: The method of any of aspects 5 to 11, wherein downlink control information identifying the set of frequency hopping parameters includes a single group of bits to configure one or more values for the set of frequency hopping parameters for the first set of repetitions and the second set of repetitions.

Aspect 13: The method of any of aspects 5 to 12, wherein downlink control information identifying the set of frequency hopping parameters includes a first group of bits to configure a first one or more values for the set of frequency hopping parameters for the first set of repetitions and a second group of bits to configure one or more values for the set of frequency hopping parameters for the second set of repetitions.

Aspect 14: The method of any of aspects 5 to 13, wherein downlink control information identifying the set of frequency hopping parameters includes one or more most significant bits to indicate one or more resource block offset values, from a radio resource control configured resource block offset value list, for the set of frequency hopping parameters.

Aspect 15: The method of any of aspects 1 to 14, wherein the first set of repetitions conveys a complete PUSCH message and the second set of repetitions conveys the complete PUSCH message.

Aspect 16: The method of any of aspects 1 to 15, wherein the PUSCH communication is a configured grant PUSCH communication, and wherein the configured grant PUSCH communication is a type 1 or a type 2 configured grant PUSCH communication.

Aspect 17: The method of aspect 16, further comprising: receiving a configuration message for the configured grant PUSCH communication, wherein the configuration message identifies a set of values for a resource block offset for at least one of the first set of repetitions or the second set of repetitions.

Aspect 18: The method of any of aspects 16 to 17, further comprising: receiving a downlink control information message identifying one or more frequency hopping parameters, wherein the downlink control information message activates the configured grant PUSCH communication.

Aspect 19: The method of any of aspects 1 to 18, wherein the set of transmission parameters includes at least one of: an uplink power control parameter, a transmitted precoding matrix indicator parameter, or a spatial relationship.

Aspect 20: The method of any of aspects 1 to 19, wherein the first set of repetitions are associated with a first beam, uplink power control, or transmission precoding matrix indicator and the second set of repetitions are associated with a second beam, uplink power control, or transmission precoding matrix indicator.

Aspect 21: An apparatus for wireless communication at a device, comprising a processor; memory coupled with the processor; and instructions stored in the memory and executable by the processor to cause the apparatus to perform the method of one or more aspects of aspects 1-20.

Aspect 22: A device for wireless communication, comprising a memory and one or more processors coupled to the memory, the memory and the one or more processors configured to perform the method of one or more aspects of aspects 1-20.

Aspect 23: An apparatus for wireless communication, comprising at least one means for performing the method of one or more aspects of aspects 1-20.

Aspect 24: A non-transitory computer-readable medium storing code for wireless communication, the code comprising instructions executable by a processor to perform the method of one or more aspects of aspects 1-20.

Aspect 25: A non-transitory computer-readable medium storing a set of instructions for wireless communication, the set of instructions comprising one or more instructions that, when executed by one or more processors of a device, cause the device to perform the method of one or more aspects of aspects 1-20.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   one or more memories; and
   one or more processors coupled to the one or more memories, the one or more processors configured to:
      receive radio resource control signaling identifying a set of transmission parameters for a plurality of sets of repetitions of a physical uplink shared channel (PUSCH) communication, the plurality of sets of repetitions including a first set of repetitions of the PUSCH communication and a second set of repetitions of the PUSCH communication;
      receive downlink control information signaling to identify a set of frequency hopping parameters corresponding to the plurality of sets of repetitions, wherein the downlink control information signaling includes information indicating that frequency hopping is enabled, and wherein the downlink control information signaling further includes information indicating: a first transmission precoding matrix indicator corresponding to the first set of repetitions, and a second transmission precoding matrix indicator corresponding to the second set of repetitions; and
      transmit the plurality of sets of repetitions on a set of frequencies using frequency hopping in accordance with the downlink control information signaling, wherein a first repetition of the first set of repetitions is transmitted on a first frequency hop of the set of frequencies and before a second repetition of the first set of repetitions, and wherein the second repetition of the first set of repetitions is transmitted on a second frequency hop of the set of frequencies and before a first repetition of the second set of repetitions, and wherein the first repetition of the second set of repetitions is transmitted on the first frequency hop of the set of frequencies, and wherein one or more transmission parameters of the set of transmission parameters are configured to vary between the first set of repetitions and the second set of repetitions.

2. The UE of claim 1, wherein the first set of repetitions is associated with a first beam and a first uplink power control parameter, and wherein the second set of repetitions is associated with a second beam and a second uplink power control parameter.

3. The UE of claim 1, wherein the second repetition of the first set of repetitions is transmitted before a second repetition of the second set of repetitions, and wherein the second repetition of the second set of repetitions is transmitted on the second frequency hop.

4. The UE of claim 3, wherein the first repetition of the second set of repetitions is transmitted before the second repetition of the second set of repetitions.

5. The UE of claim 1, wherein an order of repetitions of the first set of repetitions and the second set of repetitions is configured via the radio resource control signaling.

6. The UE of claim 1, wherein frequency hopping between frequencies of the set of frequencies is performed in accordance with the set of frequency hopping parameters.

7. The UE of claim 1, wherein the downlink control information signaling configures the set of frequency hopping parameters for the first set of repetitions and the second set of repetitions.

8. The UE of claim 1, wherein the downlink control information signaling sets at least one frequency hopping parameter from previous radio resource control signaling identifying the set of frequency hopping parameters, for at least one of the first set of repetitions or the second set of repetitions.

9. The UE of claim 1, wherein the set of frequency hopping parameters further includes at least one of:
   a frequency hopping mode parameter, or
   a resource block offset parameter.

10. The UE of claim 1, wherein the set of frequency hopping parameters is common to the first set of repetitions and the second set of repetitions.

11. The UE of claim 1, wherein the set of frequency hopping parameters is associated with a first group of values for the first set of repetitions and a second group of values for the second set of repetitions.

12. The UE of claim 1, wherein the downlink control information includes a single group of bits to configure one or more values for the set of frequency hopping parameters for the first set of repetitions and the second set of repetitions.

13. The UE of claim 1, wherein the downlink control information includes a first group of bits to configure a first one or more values for the set of frequency hopping parameters for the first set of repetitions and a second group of bits to configure one or more values for the set of frequency hopping parameters for the second set of repetitions.

14. The UE of claim 1, wherein the downlink control information includes one or more most significant bits to indicate one or more resource block offset values, from a radio resource control configured resource block offset value list, for the set of frequency hopping parameters.

15. The UE of claim 1, wherein the first set of repetitions conveys a complete PUSCH message and the second set of repetitions conveys the complete PUSCH message.

16. The UE of claim 1, wherein the PUSCH communication is a configured grant PUSCH communication, and wherein the configured grant PUSCH communication is a type 1 or a type 2 configured grant PUSCH communication.

17. The UE of claim 16, wherein the one or more processors are further configured to:
receive a configuration message for the configured grant PUSCH communication, wherein the configuration message identifies a set of values for a resource block offset for at least one of the first set of repetitions or the second set of repetitions.

18. The UE of claim 16, wherein the downlink control information signaling activates the configured grant PUSCH communication.

19. The UE of claim 1, wherein the set of transmission parameters includes at least one of:
an uplink power control parameter,
a transmitted precoding matrix indicator parameter, or
a spatial relationship.

20. A method of wireless communication performed by a user equipment (UE), comprising:
receiving radio resource control signaling identifying a set of transmission parameters for a plurality of sets of repetitions of a physical uplink shared channel (PUSCH) communication, the plurality of sets of repetitions including a first set of repetitions of the PUSCH communication and a second set of repetitions of the PUSCH communication;
receiving downlink control information signaling to identify a set of frequency hopping parameters corresponding to the plurality of sets of repetitions, wherein the downlink control information signaling includes information indicating that frequency hopping is enabled, and wherein the downlink control information signaling further includes information indicating: a first transmission precoding matrix indicator corresponding to the first set of repetitions, and a second transmission precoding matrix indicator corresponding to the second set of repetitions; and
transmitting the plurality of sets of repetitions on a set of frequencies using frequency hopping in accordance with the downlink control information signaling,
wherein a first repetition of the first set of repetitions is transmitted on a first frequency hop of the set of frequencies and before a second repetition of the first set of repetitions, and wherein the second repetition of the first set of repetitions is transmitted on a second frequency hop of the set of frequencies and before a first repetition of the second set of repetitions, and wherein the first repetition of the second set of repetitions is transmitted on the first frequency hop of the set of frequencies, and wherein one or more transmission parameters of the set of transmission parameters are configured to vary between the first set of repetitions and the second set of repetitions.

21. The method of claim 20, wherein the first set of repetitions is associated with a first beam a first uplink power control parameter, and wherein the second set of repetitions is associated with a second beam and a second uplink power control parameter, or a second transmission precoding matrix indicator.

22. The method of claim 20, wherein the second repetition of the first set of repetitions is transmitted before a second repetition of the second set of repetitions, and wherein the second repetition of the second set of repetitions transmitted on the second frequency hop.

23. The method of claim 22, wherein the first repetition of the second set of repetitions is transmitted before the second repetition of the second set of repetitions.

24. The method of claim 20, wherein an order of repetitions of the first set of repetitions and the second set of repetitions is configured via the radio resource control signaling.

25. The method of claim 20, wherein frequency hopping between frequencies of the set of frequencies is performed in accordance with the set of frequency hopping parameters.

26. The method of claim 20, wherein the downlink control information signaling configures the set of frequency hopping parameters for at least one of the first set of repetitions or the second set of repetitions.

27. A non-transitory computer-readable medium storing one or more instructions for wireless communication, the one or more instructions comprising:
one or more instructions that, when executed by one or more processors of a user equipment (UE), cause the one or more processors to:
receive radio resource control signaling identifying a set of transmission parameters for a plurality of sets of repetitions of a physical uplink shared channel (PUSCH) communication, the plurality of sets of repetitions including a first set of repetitions of the PUSCH communication and a second set of repetitions of the PUSCH communication;
receive downlink control information signaling to identify a set of frequency hopping parameters corresponding to the plurality of sets of repetitions, wherein the downlink control information signaling includes information indicating that frequency hopping is enabled, and wherein the downlink control information signaling further includes information indicating: a first transmission precoding matrix indicator corresponding to the first set of repetitions, and a second transmission precoding matrix indicator corresponding to the second set of repetitions; and
transmit the plurality of sets of repetitions on a set of frequencies using frequency hopping in accordance with the downlink control information signaling,
wherein a first repetition of the first set of repetitions is transmitted on a first frequency hop of the set of frequencies and before a second repetition of the first set of repetitions, and wherein the second repetition of the first set of repetitions is transmitted on a second frequency hop of the set of frequencies and before a first repetition of the second set of repetitions, and wherein the first repetition of the second set of repetitions is transmitted on the first frequency hop of the set of frequencies, and wherein one or more transmission parameters of the set of transmission parameters are configured to vary between the first set of repetitions and the second set of repetitions.

28. The non-transitory computer-readable medium of claim 27, wherein the downlink control information signaling configures the set of frequency hopping parameters for the first set of repetitions and the second set of repetitions.

29. An apparatus for wireless communication, comprising:
means for receiving radio resource control signaling identifying a set of transmission parameters for a plurality of sets of repetitions of a physical uplink shared channel (PUSCH) communication, the plurality of sets of repetitions including a first set of repetitions of the PUSCH communication and a second set of repetitions of the PUSCH communication;

means for receiving downlink control information signaling to identify a set of frequency hopping parameters corresponding to the plurality of sets of repetitions, wherein the downlink control information signaling includes information indicating that frequency hopping is enabled, and wherein the downlink control information signaling further includes information indicating: a first transmission precoding matrix indicator corresponding to the first set of repetitions, and a second transmission precoding matrix indicator corresponding to the second set of repetitions; and means for transmitting the plurality of sets of repetitions on a set of frequencies using frequency hopping in accordance with the downlink control information signaling, wherein a first repetition of the first set of repetitions is transmitted on a first frequency hop of the set of frequencies and before a second repetition of the first set of repetitions, and wherein the second repetition of the first set of repetitions is transmitted on a second frequency hop of the set of frequencies and before a first repetition of the second set of repetitions, and wherein the first repetition of the second set of repetitions is transmitted on the first frequency hop of the set of frequencies, and wherein one or more transmission parameters of the set of transmission parameters are configured to vary between the first set of repetitions and the second set of repetitions.

30. The apparatus of claim 29, wherein the downlink control information signaling configures the set of frequency hopping parameters for the first set of repetitions and the second set of repetitions.

* * * * *